though large changes in temperature result in substantial variation of the oil volumes.

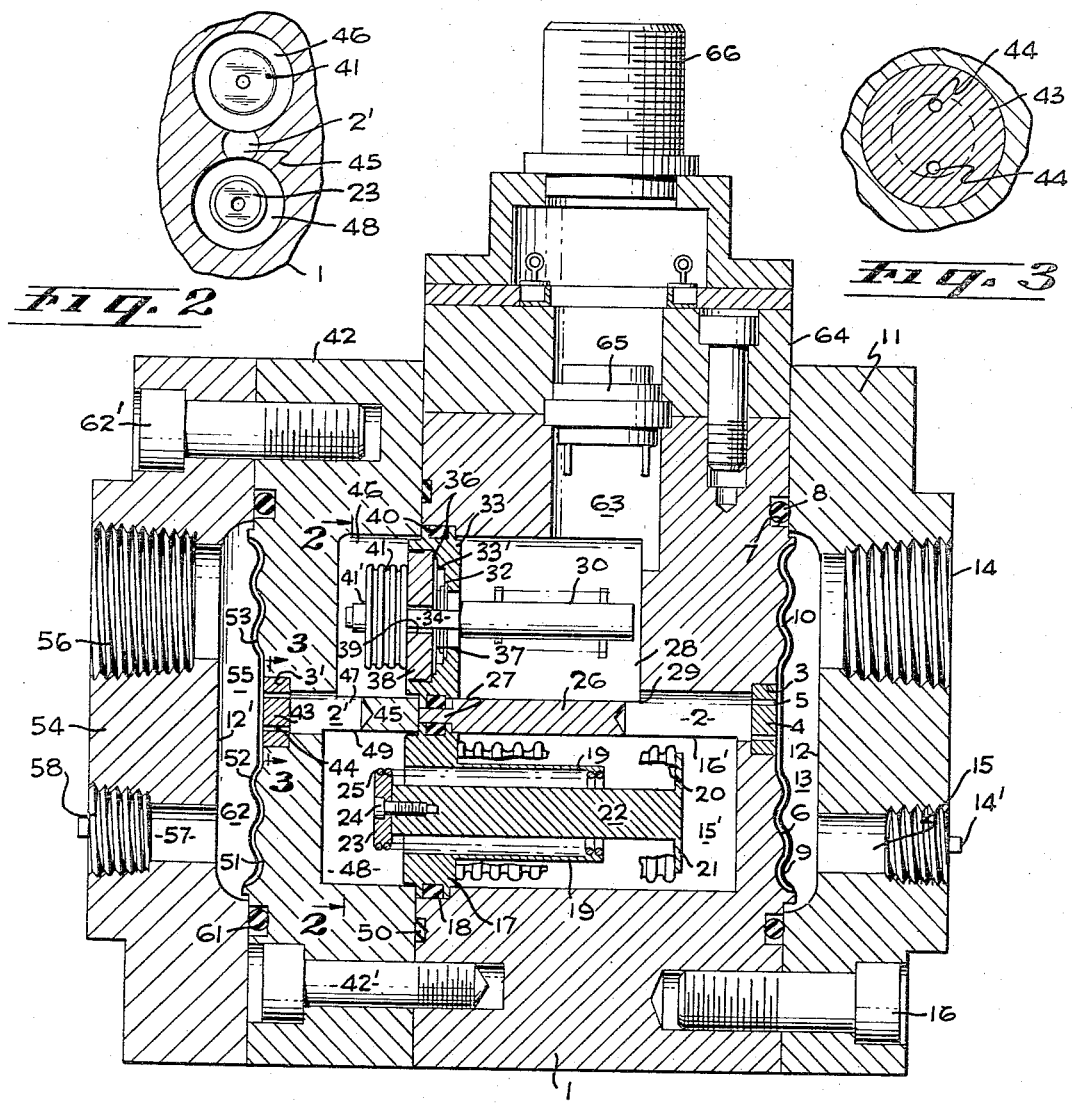

United States Patent Office 3,313,158
Patented Apr. 11, 1967

3,313,158
HIGH OVERLOAD PRESSURE TRANSDUCER
Mario Di Giovanni, Pacific Palisades, Calif., assignor to Statham Instruments, Inc., Los Angeles, Calif., a corporation of California
Filed July 23, 1965, Ser. No. 478,017
1 Claim. (Cl. 73—407)

This application is a continuation in part of application Ser. No. 210,532 filed July 17, 1962, now abandoned.

This invention relates to a transducer and is particularly directed to a high overload protection means for such a transducer.

In many forms of transducers the permissible travel of the sensing diaphragm is limited by the parameters of sensing diaphragm, and, for some forms of sensing elements, by the sensing element. Thus, for example, where the sensing element is a strain gage or an inductive element, the permissible travel of the sensing diaphragm is in the order of thousandths of an inch. This imposes a severe limitation on the permissible ratio of the effective area force summing diaphragm and the sensing diaphragm and on the permissible travel of the force summing diaphragm. For any such ratio, this establishes the maximum force to which the device may be exposed without injury.

In many types of operations, for example, in pressure gages, the applied force may accidentally or be deliberately applied in excess thereof. Such excess force is called an overload. Devices for protecting transducers against such overload are called overload protection devices.

This invention relates to overload protection devices in transducers for sensing the magnitude of an applied force.

In one embodiment forming the preferred embodiment of my invention, diaphragms employed to act as force summing means, are employed to transfer the pressure to a pressure sensing diaphragm. The deflection of the force summing diaphragm is transmitted to the sensing diaphragm which actuates the transduction means. In the term diaphragm I include flexible bellows.

In such gages, especially if the sensing diaphragm is designed to operate at low pressure ranges, the gage may be accidentally subjected to excessive pressure and the sensing diaphragm, and even the force summing diaphragm, may be overstressed and the pressure gage damages.

In the pressure gage of my invention, I employ a liquid for transmitting the applied pressure from a pressure, i.e., force summing diaphragm to the pressure, i.e., force, sensing diaphragm, and provide a stop for the force summing diaphragm. I also provide a variable volume chamber to take up excess liquid volume displaced by the deflection of force summing diaphragm as it bottoms against the stop, so that the transmitted pressure from the force summing diaphragm to the sensing diaphragm does not overstress the sensing diaphragm.

In the normal operation, the liquid pressure transmitted to the sensing diaphragm is made to respond to the motion of the force summing diaphragm and thus responsive to the pressure applied against the summing diaphragm. When an excessive pressure is applied to the summing diaphragm sufficient to bottom the diaphragm against the stop, and thus exert an excessive pressure against the sensing diaphragm, the variable volume chamber increases in available volume to take up excess liquid displaced by the bottoming force summing diaphragm, and thus limit the liquid pressure transmitted from the force summing diaphragm to the sensing diaphragm.

Reference is made to the Brown Patent 3,058,350 filed Oct. 6, 1959, patented Oct. 16, 1962.

The present invention employs a single relief chamber and a single relief diaphragm whose position at zero differential pressure is in a balanced condition and which undergoes displacement on application of any differential pressure; and in amount proportional to the difference in pressure.

I may thus minimize the volume of oil necessary and may match the volumes on both sides of the single relief bellows.

This is an important advantage in a differential pressure transducer which is subject to temperature variations. It permits maintenance of a constant zero displacement of the sensing diaphragm and sensing transducer even though large changes in temperature result in substantial variation of the oil volumes.

One preferred embodiment of my invention, as applied to a differential pressure gage, is described below in connection with the drawings, of which:

FIG. 1 is a vertical section of the pressure gage of my invention;

FIG. 2 is a section taken through line 2—2 of FIG. 1; and

FIG. 3 is a section taken on line 3—3 of FIG. 1.

FIG. 4 is a detail of a modification of the gage shown in FIGS. 1–3.

FIG. 5 is a detail of another modification of the gage of FIGS. 1–3.

In FIG. 1, 1 is the case of the pressure gage through which is passed a central bore 2, counterbored at 3 to receive a plug 4 having two parallel orifices 5. One face of the case 1 is corrugated at 6 in circumferential corrugations concentrically placed in the face of the case 1. An O-ring receiving groove 7 is provided. Mounted upon the face of 1, to be sealed by the O-rings 8, is the closure 11, recessed as 12 to provide a chamber 13. Mounted on the face of the case 1 is a diaphragm 9, corrugated complementary to the corrugation 6 and sealed at its edges to the face of the case 1 by welding or other suitable fluid-type seal, and spaced from the corrugation 6 to provide a diaphragm chamber 10 sealed by the diaphragm 9.

The closure 11 is held in place in fluid-type connection by means of a series of spaced screws 16, and is provided with a fluid inlet connection at 14 and a circulation hole 15, usually closed by a plug 14', as shown.

Positioned at one side of the bore 2 is a cavity 15', which intersects the bore 2 at 16'. The relief cavity 15' is closed at one end by the plug 17, sealed against the case 1 and the plug 26, to be described below, by means of an O-ring 18.

The plug 17 has a tubular shoulder 19, about which is placed the relief bellows 20, sealed at one end to the plug 17 and at the other end to a plate 21, carried by a rod 22 passing through the central bore of 19 and the central bore of 17. The other end of the rod 22 carries a plate 23, held in position by a stud 24. A spring 25 is positioned in the interior of the bore 19 and about the exterior of the rod 22 is threaded into position in helical receiving grooves at one end of the tube 19 and at the other end in the plate 23.

A wall portion 26, carrying a reduced portion 27, is positioned in the bore 2 and is sealed against the plug 17 by means of the O-rings 18, 27 being suitably grooved for such purposes.

On the other side of the bore 2 is a transducer chamber 28, which is sealed by the wall 26 but communicates through 29 with the bore 2 and the relief chamber 15'. Positioned within the chamber 28 is the transducer element 30, which may be any kind of transducer for the purposes described, as will be more fully discussed below. The rod 34 is connected to the transducer and to the bellows 41, which is sealed against the plug 38 and closed at 41′. The cavity 28 is sealed by the plug 33 against the neck 27 and the case 1 by means of the O-ring 40. Plug 38 is bored and counterbored at 33 and 36, and bored at 32, to receive stop shoulder 37, integral with 34. The rod 34 passes through a bore 39 in plug 38, sealed in position in the plug 33.

The case is closed by an end closure 42, by means of a series of bolts 42′ and an O-ring 50. The closure 42 has a central bore 2′, counterbored at 3′ to receive a plug 43, carrying a pair of parallel orifices 44. A wall portion 45 carrying a bore 2′ is butted against the end of the neck 27. Two chambers are thus provided at 48 and 46, which communicate through 49 and 47 with each other and with the bore 2′. Chamber 48 is separated from chamber 28 by the flexible wall formed by the bellows 41. Chamber 15′ is separated from chamber 48 by the bellows 20.

The face of the closure 42 is corrugated with a series of concentric circumferential corrugations 51, similar to those described in connection with 6. The closure 42 carries a diaphragm 52 sealed at its edges to the closure 42 and corrugated to be complementary to the corrugations 51 and spaced from the corrugations 51 to give a diaphragm chamber 53 similar to diaphragm chamber 10. The cover 54 is sealed against the closure 42 by means of the O-ring 61 and a plurality of screws 62′. It is recessed at 12′ to provide a chamber 62, which communicates with a port 56 to receive a fitting and a circulation bore 57, which is closed by a plug 58.

The diaphragms 52 and 9 are referred to as the force-summing diaphragms and the diaphragm 41 is referred to herein as the sensing diaphragm or bellows, since a diaphragm may be used in place of the bellows. The bellows 20 is referred to as the relief bellows, and it will be understood that a diaphragm may be employed in place thereof, by a suitable modification of the construction.

I prefer to use bellows at 41 and 20 in order to obtain the sensitivity and travel which is desired.

The sensing element 30 may be any transducer element which will give an electrical output responsive to the displacement of the bellows 41. Strain gages such as the Statham resistance strain wire gages, now well known in industry, may be employed; and 30 illustrates one form of such strain gage, but it will be understood that other strain wire gages or inductive transducers, other devices used in industry to measure displacement, for example, those used to measure displacement of a bellows or diaphragm in pressure gages, may be employed.

A side bore 63 is provided carrying a closure 64 in which are positioned terminal plates 65 and terminal plug 66 for connection of electrical leads to the transducer 30.

The entire case, including space 10, orifice 5, bore 2, chambers 15′ and 28, interior of bellows 41, bore 2′, chambers 46 and 48, the interior of the bore 19 and bellows 20, the orifices 44 and the space 52 are filled with a liquid such as an insulating oil. Thus, all volumes between the diaphragms 9 and 52 are filled with oil. The volume of oil, i.e., the volume of the spaces communicating with the exterior surface of the bellows 20 and consequently the interior of the bellows 41, should be substantially equal to that communicating with the interior surfaces of the bellows 20, and thus also with the exterior surface of the bellows 4′.

Thus, the volume change of the oil due to temperature is equal on both sides of the sensing diaphragm, and spurious output is occasioned by deflection of the sensing diaphragm, which otherwise may occur. Also, the bulk modulus of elasticity of the liquid may, at the imposed differential pressure, result in a contraction of the oil volume on application of the pressure. If the volumes are not sufficiently matched, a differential displacement of the force-summing diaphragm and a consequent movement of the sensing bellows may occur, in addition to the displacement resulting from the transfer of oil by applied pressure, as described above. The displacement occurs even if the pressures applied through 14 and 56 were equal, and thus a zero shift occurs, if the volumes are mismatched. This is particularly true when the force-summing diaphragms are of material having substantial stiffness, such as a metallic diaphragm, for example, a steel, beryllium-copper alloy or other metal diaphragm. This factor becomes of lesser importance as the diaphragm becomes more flexible and the range of the pressure differences imposed on the system in operation is the higher.

Such a mismatch in the transducer of my invention is avoided by employing a single relief chamber 15′ and a single bellows 20 to balance the volume changes due to the deflection of the diaphragms 9 and 52. The volume changes caused by the displacement of the diaphragms are communicated from the diaphragm chambers 10 and 53 to opposite sides of the bellows 20. Thus, a unit displacement of the diaphragms 52 and 9, for example, due to temperature changes, will cause a like volume change in the fluid spaces on the interior sides of the diaphragms 52 and 9 and, thus, no zero shift.

In operation, with the plugs 58 and 14′ in position, and unequal pressure applied through 56 and 14, the diaphragms 52 and 9 are displaced differentially in order to develop a pressure in the diaphragm chambers 53 and 10, which is transmitted through the orifices 44 and 5 to the bore 2 and to the bore 2′ and thence from bore 2 into chamber 28 and into chamber 15′, and from 2′ into chamber 46 and chamber 48. There will thus be developed in chamber 46 on the outside of bellows 41 a pressure corresponding to the pressure exerted through 56. In the chamber 28, communicated through the bores 32 and the bore 39 to the interior of the bellows 41, a pressure corresponding to the pressure exerted through 5. In like manner, the pressure through 56 is exerted in space 48 and through the interior of the bore of 19 to the interior of the bellows 20; and the pressure exerted through 5 will be communicated through bore 2 into space 15′ on to the exterior of the bellows 20.

The rod 31 therefore is displaced proportionately to the difference in pressure between 56 and 14. Depending on whether the high pressure side is on the diaphragms 9 or 52, the spring is under tension or compression.

The spring 25 introduces a spring bias and maintains the stiffness of the bellows system of bellows 20 at a specified level below the stiffness of the bellows system of bellows 41.

During normal operation, i.e., where the high pressure force-summing diaphragm (for example, 52) is not bottomed on the stop, the oil displaced by the movement of the high pressure diaphragm enters the compartments 15′, 28, 23 and 46. Bellows 20 and 41 are both displaced to accommodate this added oil volume. The oil displaced by these bellows enters space 10. The relative motion of diaphragm 20 and 41 depends on the effective transverse area of the bellows 20 and diaphragm face 41′, and the relative stiffness of the bellows systems and the volume change per unit of motion of the bellows 20 and 41′.

However, for any unit volume change resulting from the displacement of the diaphragms 9 and 52, the deflection of the bellows 41′ is less than would be obtained if the relief system, including the relief bellows 20, were not employed. The less the stiffness of the bellows system of bellows 20, for example, the weaker the spring 25 for any given stiffness of the system of bellows 41 the less will be the displacement of the bellows 41 for any given pressure difference applied in chambers 55 and 13.

The relative stiffness and relative volumes are designed so that the sensing bellows will deflect to the full scale deflection permitted by the transducer 30 before the force-summing diaphragm bottoms at the stops.

Thus, the range of the unit, i.e., the tolerable pressure difference for which the system is designed, may be effectively varied by using a different spring 25 whose spring constant has the appropriate value. It will be recognized that the design makes the replacement of the spring 25 convenient.

With pressure in 13 and 55 balanced, the spring 25 is in tension to place the bellows 20 in compression, thus permitting a greater deflection of the bellows when pressure against 55 is higher than in 13. Under these conditions of balanced pressure, bellows 41 is not displaced and the transducer 30 reports zero pressure difference. As pressure is applied, the diaphragms 55 and 9 are displaced to move differentially. The diaphragms 52 and 9 are desirably of the same size and material and thus of like stiffness. The spaces 53 and 10 are also desirably the same. However, since 52 sees a higher pressure than 9, it will be displaced towards 51, while 9 will be moved away from 6. The pressure in the interior of the bellows 20 rises above the pressure on the exterior of the bellows 20, and the bellows is extended against the opposing force of the spring. This increases the volume of the oil in the chambers communicating with the interior of the bellows 20 and decreases the volume of the oil in spaces communicating with the exterior of the bellows 20. The bellows 41, however, sees the difference in pressure in the two volumes. Its displacement is much less than it would experience if the total volume of oil displaced by the movement of diaphragm 9 and 52 were to be taken up by the displacement of 41 alone, as would be the case if the bellows 20 and the attendant structure were not present.

These volumes and the displacement of the bellows 20 and 41 and so designed that, when the high pressure diaphragm bottoms against 51, the bellows 20 displaces sufficiently to assure that the bellows 41 is not compressed sufficiently to over-stress the bellows.

FIG. 4 illustrates a variation of the structure positioned in chamber 15'. Instead of the bellows 20, rod 22 and spring 25, I may use a free piston 120 carrying piston seal 121, slidably positioned between springs 122 and 124, held in position by spider 123 and plug 125. The function of the assembly of FIG. 4 is similar to that of the assembly of FIG. 1. It is to be noted that the end 21 of the relief bellows acts like a piston and wherein in the claims a relief bellows or diaphragm is referred to it will be understood to include also a piston.

In FIG. 1 the orifices 5 and 44 may be made of diameter and length and number so that their impedance may be matched so that the frequency of response to an applied pressure is made sufficiently low so that high frequency pulses do not affect the unit. In such case, pulses of frequency higher than those matched by the holes pass without causing a displacement of the diaphragm 41'. The smaller the hole the lower will be the frequency of the pulses which will be prevented from being sensed by 41'. The orifices thus act as a restriction in the passageways from the diaphragm chamber to the relief and transducer chambers to introduce the desired degree of fluid damping.

FIG. 5 shows a variation of the diaphragm and diaphragm chamber construction which may be employed in place of the structure associated with diaphragm 9 or 52, or both. The wall 201, which may be the face of case 6 or closure 42, is not corrugated but is relieved at 202 and closed by diaphragm 203, sealed at its periphery to 201, similarly to diaphragms 9 and 52. The restricted orifice 204, which corresponds to 2' or 2, is similarly closed by a plug 205. In this case, it is shown as carrying one bore 206 whose diameter and length are such as to provide for the degree of damping and frequency control as described above.

The plug 205 carries an O-ring 208 arranged concentrically about the bore 206. The diaphragm 203 carries a centrally-disposed rigid closure plate 207 such that, when the diaphragm 203 has traveled its assigned maximum displacement, the plate 207 seals in the O-ring 208 and closes the bore 206 and communication between the space 208 and the bore 204 is cut off. This traps liquid in chamber 209 and prevents any further deflection of the force-summing diaphragm and further transfer of oil to the interior of the case. This has the further advantage that the force-summing diaphragm is not materially deformed, no matter how great the force applied to the diaphragm, limited only by the bulk modulus of elasticity of the liquid.

While I have described a particular embodiment of my invention for purposes of illustration, it should be understood that various modifications and adaptations thereof may be made within the spirit of the invention, as set forth in the appended claim.

I claim:

A transducer comprising a case, a pair of transverse walls in said case forming a pair of opposed diaphragm chambers in said case, a force summing diaphragm closing each diaphragm chamber in said case, each diaphragm mounted adjacent to one of said walls, a fluid inlet chamber on the other side of each diaphragm, a sensing transducer chamber positioned between said diaphragm chamber walls, a sensing transducer in said transducer chamber, a sensing diaphragm in said sensing transducer chamber connected to said sensing transducer, only one relief chamber positioned in said case between said diaphragm chambers, a relief diaphragm in said relief chamber, a fluid communication passageway through one of said walls to one side of the said sensing diaphragm and one side of said relief diaphragm, fluid communication between said side of said sensing diaphragm and said side of said relief diaphragm, a fluid communication passageway through the other of said walls to the other side of said sensing diaphragm and the other side of said relief diaphragm and a fluid communication between the other side of said sensing diaphragm and the other side of said relief diaphragm, fluid in said case and filling said chambers and passageways, the size and stiffness of the force summing diaphragms being substantially the same and the volume of the diaphragm chambers being substantially the same, the stiffness opposing the deflection of the relief diaphragm being substantially less than the stiffness opposing the deflection of said sensing diaphragm.

References Cited by the Examiner
UNITED STATES PATENTS

| | | | |
|---|---|---|---|
| 2,977,991 | 4/1961 | Bauer | 73—407 X |
| 2,989,084 | 6/1961 | Jones | 73—410 X |
| 3,058,350 | 10/1962 | Brown | 73—407 |
| 3,085,437 | 4/1963 | Osterstrom | 73—407 |

LOUIS R. PRINCE, *Primary Examiner.*

D. O. WOODIEL, *Assistant Examiner.*